United States Patent [19]
Parker et al.

[11] Patent Number: 5,716,107
[45] Date of Patent: Feb. 10, 1998

[54] WHEEL ASSEMBLY

[75] Inventors: Brian G. Parker, Alto; Albert Selen, Plainwell, both of Mich.; Bruce E. Harrison; Steven R. Laney, both of Warsaw, Ind.

[73] Assignee: Cascade Engineering, Inc., Grand Rapids, Mich.

[21] Appl. No.: 714,895

[22] Filed: Sep. 17, 1996

Related U.S. Application Data

[63] Continuation-in-part of Ser. No. 378,651, Jan. 25, 1995, abandoned.

[51] Int. Cl.$^6$ ............................................. B60B 27/02
[52] U.S. Cl. ............................................. 301/111; 301/121
[58] Field of Search ............................ 301/111, 112, 301/119, 120, 121, 122

[56] References Cited

U.S. PATENT DOCUMENTS

| | | |
|---|---|---|
| 334,049 | 1/1886 | Raddin . |
| 531,701 | 1/1895 | Smith . |
| 684,664 | 10/1901 | Anderson . |
| 765,575 | 7/1904 | Gould . |
| 982,413 | 1/1911 | Davis ........................ 301/119 |
| 1,067,367 | 7/1913 | Noster . |
| 3,870,371 | 3/1975 | Solomon ..................... 301/111 X |
| 4,043,685 | 8/1977 | Hyams . |
| 5,215,356 | 6/1993 | Lin . |
| 5,222,786 | 6/1993 | Sovis et al. . |

FOREIGN PATENT DOCUMENTS

| | | | |
|---|---|---|---|
| 2911406 | 10/1980 | Germany .................... | 301/112 |
| 3811757 | 10/1989 | Germany .................... | 301/111 |

*Primary Examiner*—Russell D. Stormer
*Attorney, Agent, or Firm*—Rader, Fishman, Grauer & Mc Garry

[57] ABSTRACT

A reusable, releasably lockable wheel assembly comprising a wheel having a centrally disposed hub defining an aperture in which is received an axle. A spring having diametrically opposed lugs is disposed on one side of the hub and the lugs extend into the aperture of the hub so that when the axle is inserted into the aperture, the lugs are biased into the groove on the end of the axle to lock the wheel to the axle. The lugs can be forced outwardly by a tool to withdraw the lugs from the groove so that the axle can be unlocked with respect to the wheel for removal of the wheel. In one embodiment, cooperation between a wheel cover and the spring limits slidable movement between the wheel and axle. In another embodiment, cooperation between an end cap on the wheel hub and the spring limits the slidable movement.

30 Claims, 5 Drawing Sheets

WHEEL ASSEMBLY

This is a Continuation-in-part of U.S. patent application Ser. No. 08/378,651 filed on Jan. 25, 1995, now abandoned.

BACKGROUND OF THE INVENTION

1. Field of the Invention

This invention relates to a wheel assembly, and more specifically to a wheel assembly for a cart or similar article wherein the wheel is releasably locked to an axle.

2. Description of the Related Art

Wheel assemblies used on small or lightweight vehicles, such as golf carts, tricycles, baby carriages, child's wagon, etc., typically have a metal or plastic wheel with a central aperture through which passes an axle. The wheel is retained on the axle by a metal cap having outwardly slanted metal teeth on the inner surface thereof. This cap is sometimes known as a "Tinnerman" fastener. The axle is slidably mounted within the aperture in the wheel and the cap is then mounted to the end of the axle to prevent the removal of the wheel. Typically, the cap is struck by a hammer to drive the cap onto the end of the axle. The teeth slide over the axle as the cap is mounted on the axle. Because of the reverse angle of the teeth, they dig into the axle to prevent the inadvertent removal of the cap from the axle.

The cap does not always function as intended. Occasionally, the cap is slanted on the axle when struck by a hammer and does not seat properly, resulting in premature loss of the cap. Further, the cap can be removed by simple tools, leading to the unwanted removal of the wheels by vandals. Also, once removed, the cap is sufficiently deformed or destroyed so that it generally cannot be reused.

Another wheel fastener system has been developed for use with these types of wheels. It has received a DIN standard approval and, accordingly, is sometimes called a DIN cart wheel. A circumferential groove is provided on or near the ends of the axle. The wheel has one or more pins which are spring loaded with a plain metal spring in the hub of the wheel. The pin or pins project into the circumferential groove in the axle. Unfortunately, the spring rusts or corrodes and ultimately breaks. The wheel then falls off the axle. The DIN cart wheel is also fairly expensive, especially as compared to the so-called "Tinnerman" fastener.

There are other prior devices for attaching a wheel to an axle. U.S. Pat. No. 5,188,430 to Chiu, issued Feb. 23, 1993 discloses a golf cart wheel assembly wherein a tubular shaft bushing is disposed within the hub of a wheel and has an opposing pair of integrally molded fingers whose tips are biased into openings in the side of the tubular shaft bushing where they are received in detents in the axle to retain the wheel to the axle. U.S. Pat. No. 5,277,480 to Chiu, issued Jan. 11, 1994, discloses a tubular sleeve snap-fit within the wheel hub and having press tabs diametrically positioned at the end of the tubular sleeve in such a manner that the tips of the press tabs are received within an annular groove on the end of the axle when the axle is inserted through the tubular sleeve to retain the axle to the wheel. The press tabs are released from engagement with the annular groove by pressing on the press tabs in the direction along the longitudinal axis of the tubular sleeve.

U.S. Pat. No. 849,952 to Willis, issued Apr. 9, 1907, discloses an axle nut comprising a bail with two inwardly directed and diametrically positioned fingers, which are received within diametrically positioned apertures in the axle. The fingers are removed by rotating the bail until the bail contacts a cam portion on the axle nut, which springs the bail to withdraw the fingers from the apertures.

U.S. Pat. No. 2,253,708 to Holman, issued Aug. 26, 1941, discloses a spring clip for retaining a wire spoked wheel to an axle having an annular groove at its end. The spring clip is secured at its ends to the hub, wraps around one of the spokes, and passes between the hub and the groove in the axle to secure the hub to the axle.

U.S. Pat. No. 531,701 to Smith, issued Jan. 1, 1895, discloses opposed spring plates having fingers that are biased through apertures in a hub so that the fingers abut a flange on the end of the axle to prevent the removal of the hub from the axle.

SUMMARY OF INVENTION

According to the invention a wheel assembly comprises an axle in which a circumferential groove or an indentation is located near the end of the axle. A wheel having a central hub with an opening in which the axle is received is retained on the axle by a wheel retainer. The wheel retainer comprises at least one generally semi-circular spring having a pair of lugs. Each lug is positioned at an end of the at least one semi-circular spring and abuts the hub of the wheel and has a keeper, which is shaped to fit into the circumferential groove or indentation of the axle. The generally semi-circular spring biases the keeper into the circumferential groove or indentation of the axle to retain the wheel on the axle.

The wheel retainer preferably has two generally semi-circular springs forming a circular shape with the lugs. The lugs can have a spacer extending outwardly, adapted to contact a cap and to maintain the cap in a predetermined spaced relationship to the wheel. The cap can be mounted to a central portion of the wheel for covering the wheel retainer and to retain the wheel retainer in contact with the wheel. Preferably, the wheel retainer is integrally molded from a thermoplastic material. A web can be positioned adjacent each of the lugs to define a tool guide aperture for retracting the keepers from the groove to remove the wheel from the axle. A tool is preferably used to retract the keepers from the groove. The tool is generally U-shaped and comprises a pair of spaced shafts connected by a handle. The ends of the spaced shafts have ramped outer surfaces that abut the web to retract the keepers from the groove upon insertion of the tool into the tool guide apertures. Alternatively, the lugs can also be retracted by squeezing the two springs toward each other.

The wheel assembly according to the invention can be easily assembled and disassembled without destroying the fastening member, yet the wheel retainer is sufficiently obscure and hidden from view so that the uneducated or potential vandal will find it difficult to remove the wheel from the axle. The retainer is made from a non-corrodible plastic material so that it will be long-lived. Further, the seating of the retainer on the axle is easily seen and felt by the assembler. The assembly can take place essentially without any tools.

BRIEF DESCRIPTION OF THE DRAWINGS

The invention will now be described with reference to the drawings wherein.

DESCRIPTION OF THE PREFERRED EMBODIMENT

Figure 1:
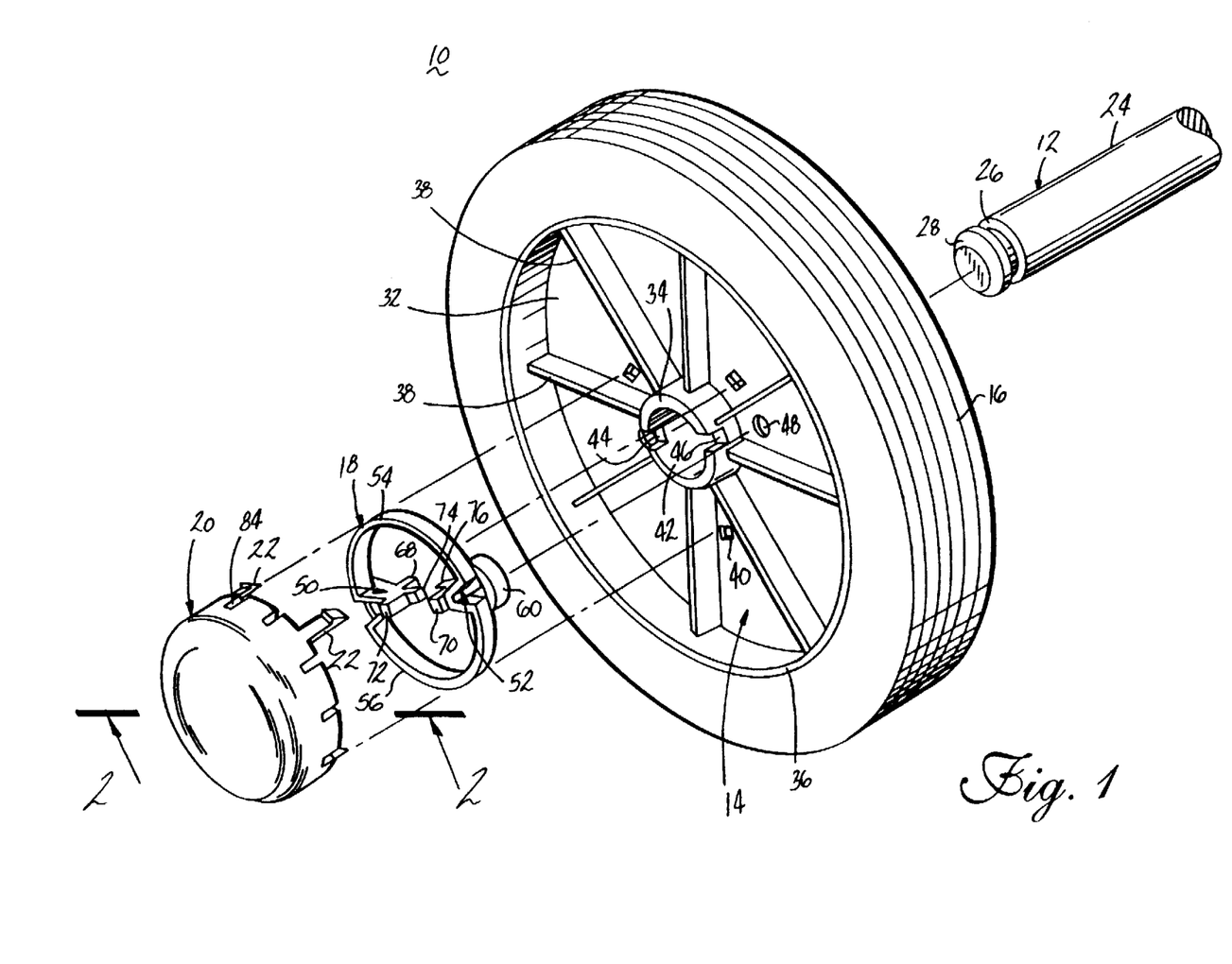
FIG. 1 is an assembly view of the wheel assembly according to the invention.

Referring now to the drawings, FIG. 1 illustrates the wheel assembly 10 according to the invention, which comprises an axle 12 on which is slidably mounted a wheel 14 with a tire 16. The wheel 14 is locked to the axle 12 by a wheel retainer 18, hidden from view when assembled by a cover 20, which is secured to the wheel by snap fingers 22. The wheel assembly 10 according to the invention can be used to mount a wheel to both ends of the axle 12. Only one of the wheel assemblies will be described in detail.

The axle 12 is formed from a rod 24 having a circumferential channel, indentation or groove 26 formed in the rod near the end thereof. A head 28 is defined by the portion of the rod 24 between the groove 26 and the end of the rod 24 and is preferably in the shape of a truncated cone. The rod 24 can be made from solid steel or can be hollow and made from other suitable structural materials.

The wheel 14 comprises a disc 32, having a hub 34 at the center of the disc and a rim 36 at the periphery of the disc. A plurality of support ribs 38 extend from the hub to the rim 36 to give structural support to the wheel 14. The tire 16 is mounted to the rim 36 of the wheel 14. The disc 32, hub 34, rim 36 and support ribs 38 of the wheel 14 are preferably molded as a single unit from a suitable thermoplastic material. The disc 32 also has four snap apertures 40 to receive snap fingers 22 in mounting the cover 20 to the wheel 14 and disc apertures 48 to provide access for a tool 90 to unlock the wheel retainer 18. The disc apertures 48 are positioned on the disc 32 so that they lie along a line passing through the notches 44, 46 in the hub.

The hub 34 defines a central aperture 42 of the wheel 14 through which the axle 12 passes upon assembly of the wheel assembly 10. Notches 44 and 46 are located in the wall of the hub 34 and are diametrically opposed to one another.

Referring to FIGS. 1 and 4–6, the axle 12 is secured to the wheel 14 by the wheel retainer 18, which comprises diametrically opposed lugs 50, 52 connected by two semi-circular spring members 54, 56, respectively. The lugs 50, 52 are mirror images of each other. Ring-shaped webs or tool guides 58, 60 extend from the lugs 50, 52 and define tool apertures 62, 64, respectively. When the wheel assembly 10 is assembled, the centers of the tool apertures 62, 64 are radially inwardly offset from the centers of the disk apertures 48 so that the lugs 50, 52 are moved outwardly upon the insertion of the tool 90. Positioning tabs 66, 68 extend away from the tool guides 58, 60 and position the wheel retainer 18 with respect to the disc 32 of the wheel 14. Spacers 70, 72 extend away from the tool guides 58 and 60 in a direction opposite the positioning tabs 66, 68. The spacers abut the cover 20 when assembled and locate the wheel retainer 18 between the cover 20 and the wheel 14.

Figures 4, 6:
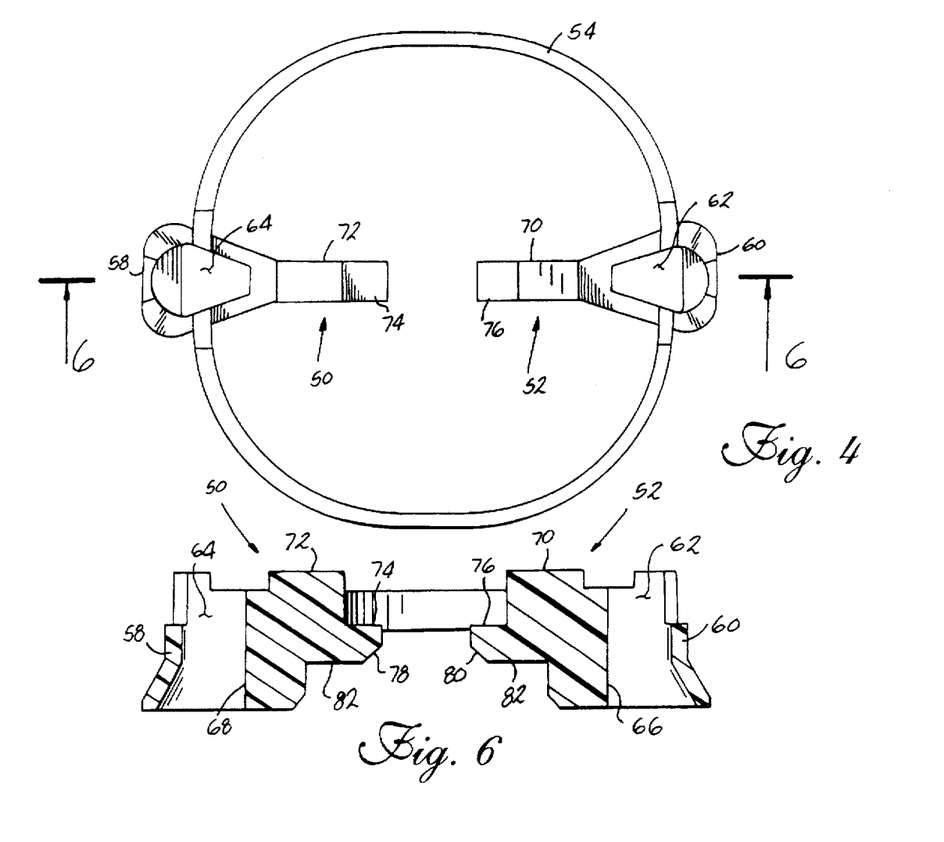
FIG. 4 is a plan view of a spring in the wheel assembly according to the invention.
FIG. 6 is a sectional view of the spring shown in FIGS. 4 and 5 taken along line 6—6 of FIG. 4.
Figure 5:
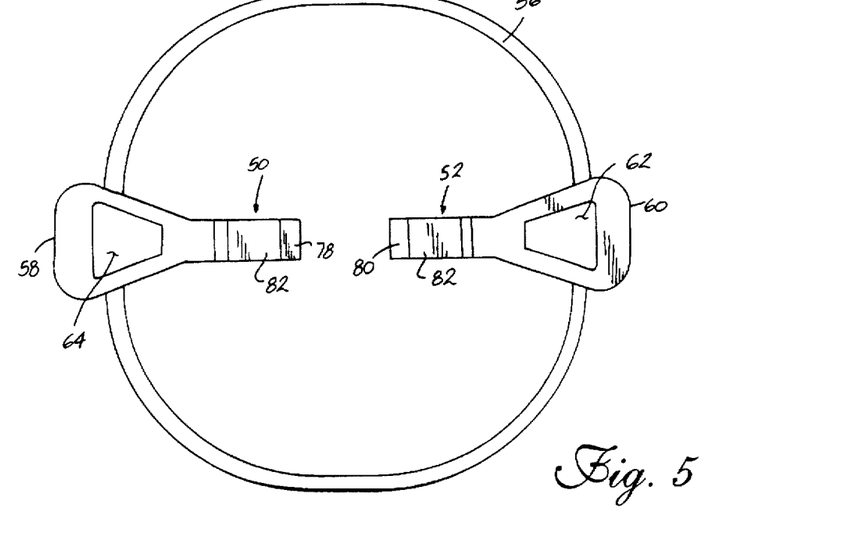
FIG. 5 is a bottom view of the spring of FIG. 4.

The lugs 50, 52 also have a pair of keepers 74, 76, which extend away from the tool guides 58, 60 and toward the center of the aperture defined by the semi-circular springs 54, 56 and lugs 50, 52. The keepers 74, 76 are sized to fit within the groove 26 of the axle to lock the axle 12 to the wheel 14. Each of the keepers 74, 76 has a beveled surface 78, 80 to aid the insertion of the head 28 of the axle 12 through the lugs 50, 52 upon assembly of the wheel assembly 10. Shoulders 82 on the keepers 74, 76 are sized to bottom on the notches 44 and 46.

The cover 20 is somewhat hemispherical in shape with multiple notches 84 disposed about the cover 20 and which coincide with the spacing of the support ribs 38 of the wheel 14 so that when the cover 20 is mounted on the wheel 14, the support ribs 38 are received within the notches 84. Snap fingers 22 extend axially from the perimeter of the cover and pass through the aperture 40 to affix the cover 20 to the disc 32 upon assembly of the wheel assembly 10.

Figure 2:
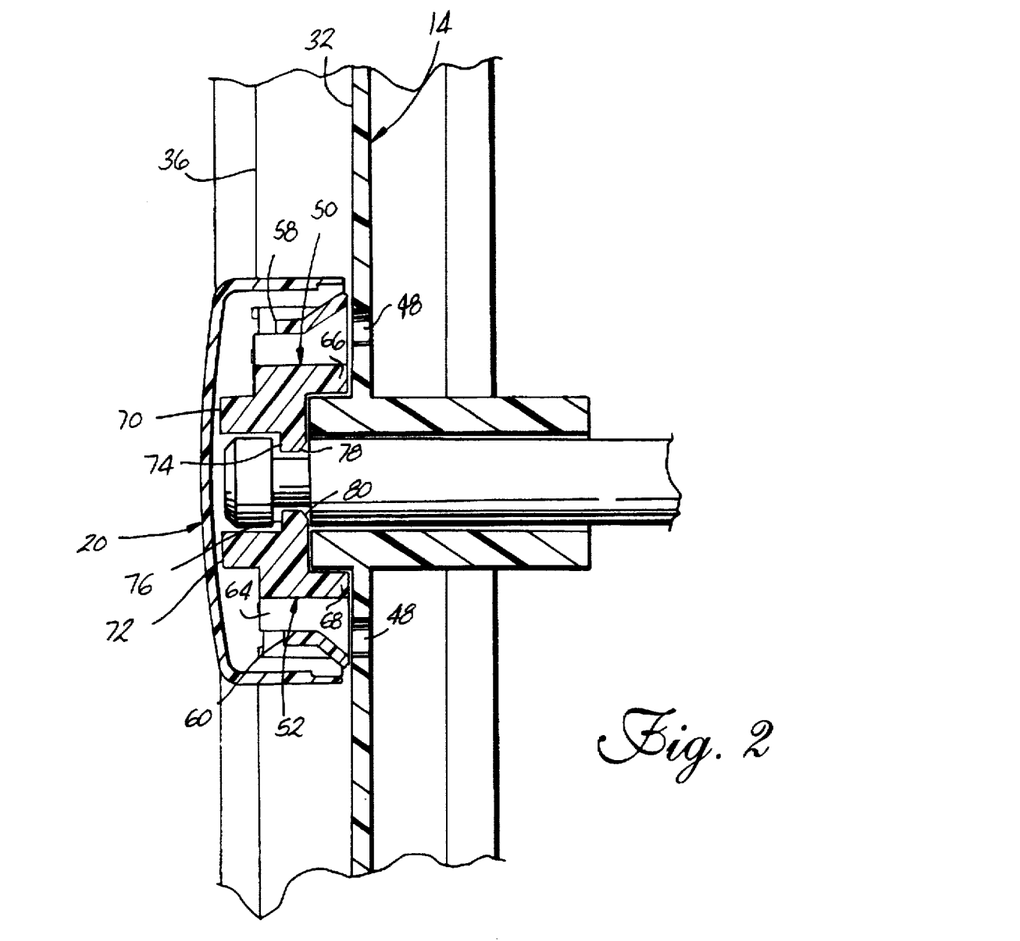
FIG. 2 is a sectional view of the assembled wheel assembly of FIG. 1 taken along line 2—2 of FIG. 1 with the wheel locked to the axle.
Figure 3:
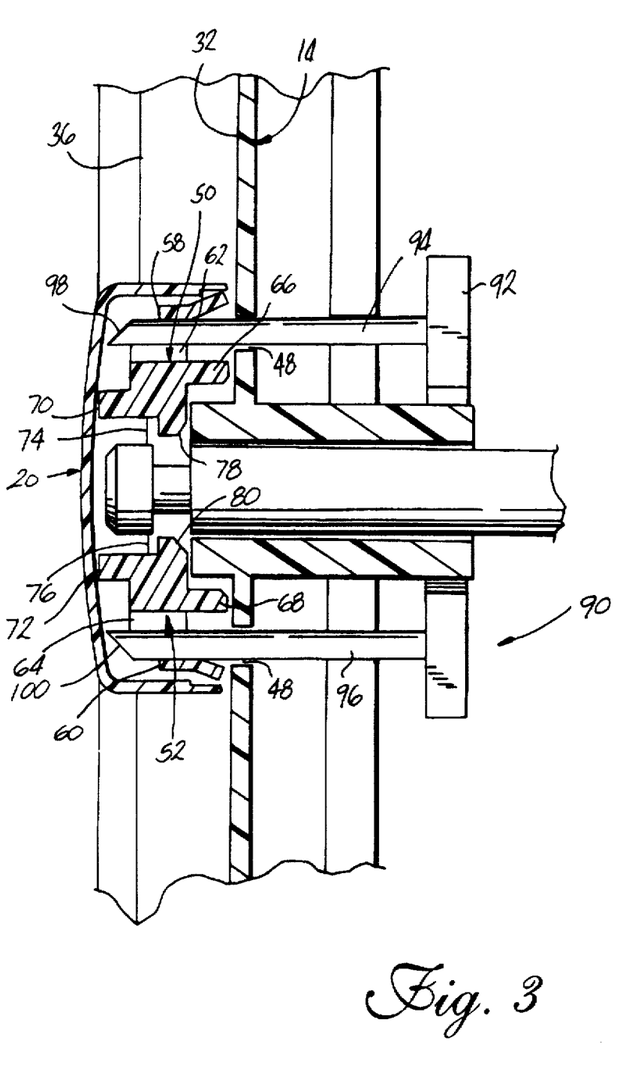
FIG. 3 is a view substantially identical to FIG. 2, except that a tool unlocking the wheel assembly is shown.

Referring to FIGS. 1–3, to assemble the wheel assembly 10, the wheel retainer 18 is oriented with respect to the wheel 14 so that keepers 74, 76 are in alignment with notches 44, 46 of the hub 34. The wheel retainer 18 is moved into contact with the wheel 14. As the wheel retainer 18 is pressed against the wheel 14, the keepers 74, 76 are received within the notches 44, 46, respectively. The wheel retainer 18 is pressed toward the disc 32 until the shoulders 82 seat in the bottom of the notches 44 and 46. With the wheel retainer 18 in this position, the semi-circular springs 54, 56 are positioned outward of the support ribs 38 of the wheel 14 and in contact therewith. In this position, the keepers 74, 76 extend into the aperture 42 of the hub 34. The cover 20 is positioned over the wheel retainer 18 so that the snap fingers 22 align with the snap aperture 40 and the support ribs 38 are received within the notches 84 of the cover 20. Snap fingers 22 are inserted through the snap aperture 40 to secure the cover 20 to the wheel 14. When the cover 20 is assembled to the wheel 14, the cover 20 abuts the spacers of the retainers 70, 72 as seen in FIG. 2 to limit the movement of the wheel retainer 18 with respect to the wheel 14 and cover 20.

Referring to FIGS. 1 and 2, the wheel 14 is mounted to the axle 12 by first assembling the wheel 14, wheel retainer 18 and cover 20 as previously described. The axle 12 is inserted into the aperture 42 of the hub 34 on the opposite side of the wheel 14 on which the wheel retainer 18 is disposed. As the axle 12 is inserted, the head 28 abuts the beveled surfaces 78, 80 of the keepers 74, 76 and moves the lugs 50, 52 outwardly with respect to the hub 34, flexing outwardly the semi-circular springs 54. Upon further insertion of the axle 12, the groove 26 will align with the keepers, 74, 76 and the flexed semi-circular springs 54, 56 will urge the keepers 74, 76 into the groove 26, locking the wheel 14 to the axle 12.

Referring to FIG. 3, tool 90 is used to unlock the wheel 14 from the axle 12. Tool 90 has a hand grip 92 from which extends opposed cylindrical shafts 94, 96, each having beveled or ramped surfaces 98, 100. Alternatively, the surfaces 98, 100 can be rounded. The shafts 94, 96 are inserted into the diametrically opposed disc apertures 48 in the disc. As the shafts 94, 96 are inserted through the disc 32 and into the tool apertures of the wheel retainer 18, the ramped surfaces 98, 100 abut the tool guides 58, 60 and move the lugs 50, 52 outwardly as the tool guides 58, 60 travel along the ramped surfaces 98, 100. The shafts 94, 96 are moved axially until the lugs 50, 52 extend radially outwardly a sufficient distance so that the keepers 74, 76 are withdrawn from the groove 26. The axle 12 can be easily removed from the wheel hub 34 by pulling on the axle 12 from the wheel 14.

Figure 7:
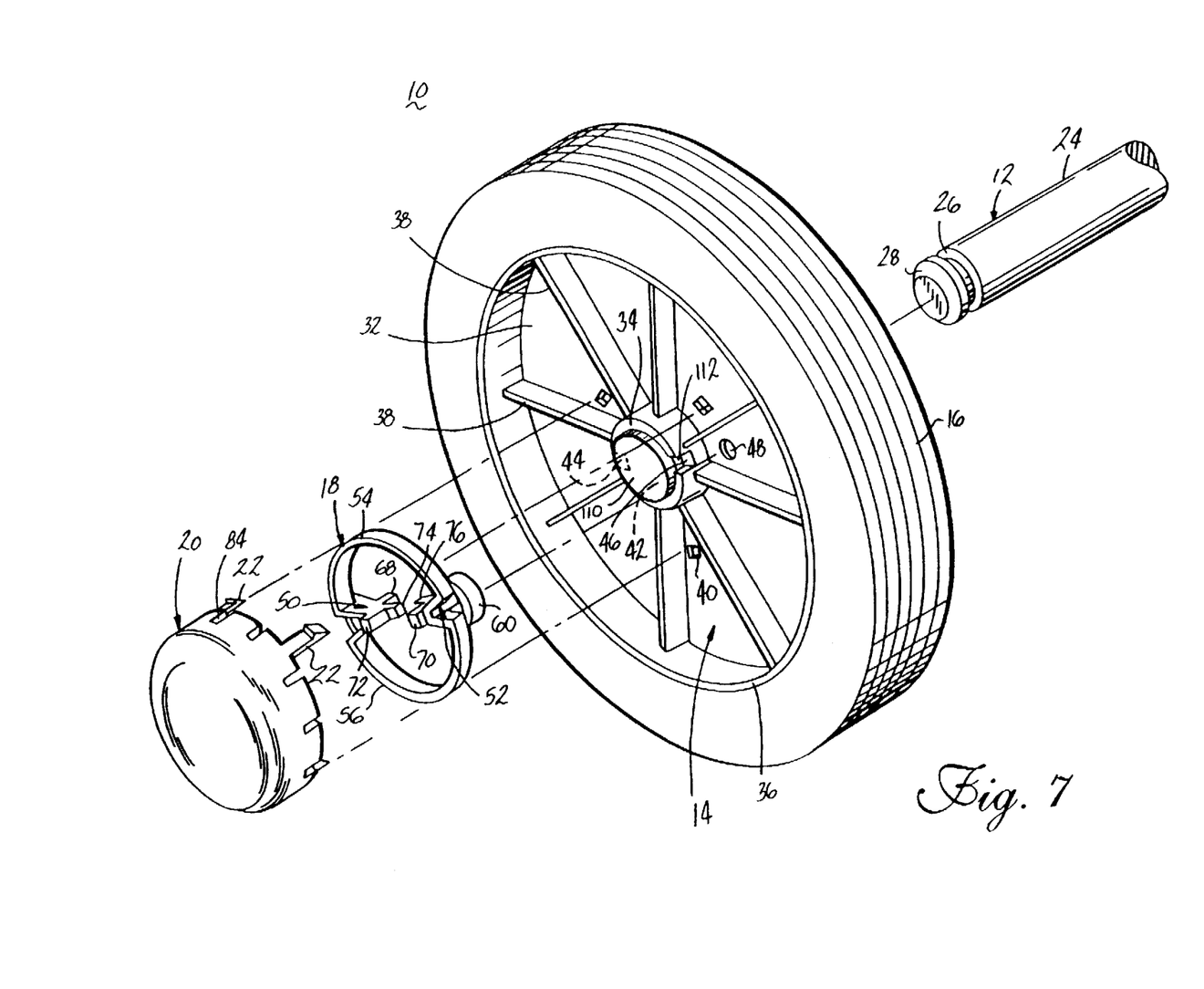
FIG. 7 is an assembly view of the wheel assembly according to an alternate embodiment of the invention.

Turning now to FIG. 7, an alternate arrangement of a wheel assembly 105 is shown, wherein like numerals in the previous embodiment are used to identify like parts in the present embodiment. In this embodiment, an end cap 110 is received within the aperture 42 of the hub 34. The end cap extends slightly outwardly from the end of the hub 34, for example, about 0.020–0.030 inch and extends slightly into the aperture 42 of the hub 34, for example, about 0.020–0.030 inch. The thickness of the end cap 110 is such that the keepers 74, 76 can fit into a pair of oppositely disposed openings 112 (only one of which is shown in FIG. 7) on the end portion of the hub 34. Each opening 112 extends between a respective notch 44, 46 and the end cap 110. The end cap 110 is preferably integrally molded with the hub 34 when the wheel 14 is manufactured, but can also be formed separately and bonded to the hub through ultrasonic welding, adhesives, press-fitting, or other well-known securing means.

To assemble the wheel assembly 105, the wheel retainer 18 is oriented with respect to the wheel 14 so that keepers 74, 76 are in alignment with notches 44, 46 of the hub 34. The wheel retainer 18 is moved into contact with the wheel 14. As the wheel retainer 18 is pressed against the wheel 14, the keepers 74, 76 are spread apart over the end cap 110 through deflection of the generally semi-circular springs 54, 56 and are received within the notches 44, 46, respectively. The wheel retainer 18 is pressed toward the disc 32 until the keepers 74, 76 clear the end cap 110 and the shoulders 82 seat in the bottom of the notches 44 and 46. When the keepers 74, 76 slide past the end cap 110, the springs 54, 56 spring back to their original undeflected state such that the keepers 74, 76 extend through the openings 112 into the aperture 42 of the hub 34 and lock the wheel retainer in position on the wheel 14. With the wheel retainer 18 in this locked position, the semi-circular springs 54, 56 are positioned outward of the support ribs 38 of the wheel 14 and in contact therewith. The axle 12 and the cover 20 can then be installed as previously described. When installed, an inner surface of the cover 20 preferably abuts an outer surface of the end cap 110. In this preferred arrangement, the spacers 70, 72 can be eliminated since they serve the same function. In the previous embodiment, the cover 20 and spacers 70, 72 function to prevent the retainer 18 from sliding off the wheel 14 and thus limit the relative sliding movement between the wheel 14 and the axle 12. In the present embodiment, the end cap 110 serves this function and also serves to prevent the wheel 14 from sliding too far onto the axle 12 during assembly and thus, pushing the cover 20 from the hub 34. The end cap 110 also resists a greater amount of axial and lateral forces exerted between the axle and wheel than the cover 20 alone, and serves to strengthen the hub 34 against lateral forces by enclosing the aperture 42.

The wheel assembly thus provides a reusable, releasably lockable mounting for a wheel on an axle. The wheel is quickly and easily mounted on the axle without the need of tools. The wheel retainer is secure and reliable. It will not fall off in use. Seating of the spring keepers into the axle groove is easily seen and felt during assembly of the spring into the axle. The wheel retainer is hidden by the cover and is not easily unlocked without the special tool, reducing vandalism and tampering. Also, the wheel retainer is not visible when the wheel assembly is assembled, providing a potential vandal little information on how to remove the wheel. Yet a knowledgeable worker can quickly remove the wheel from the axle. The plastic spring is long lived and will not corrode as metal springs do.

While particular embodiments of the invention have been shown, it will be understood, of course, that the invention is not limited thereto since modifications may be made by those skilled in the art, particularly in light of the foregoing teachings. For example, although the wheel retainer has two opposing semi-circular springs, it is within the scope of the invention for the use of only a single semi-circular spring for biasing the lugs. The shape of the spring can be generally rectangular or circular. Thus, as used herein, the term "generally semi-circular" is intended to include half oval as well as half rectangular shapes. Also, one or more indentations can replace the circumferential groove. The keepers will then be received within the indentation. Reasonable variation and modification are possible within the scope of the foregoing disclosure of the invention without departing from the spirit of the invention.

The embodiments of the invention in which an exclusive property or privilege is claimed are defined as follows:

1. A wheel assembly comprising:
   an axle with a circumferential groove;
   a wheel with a central hub having an opening passing therethrough for receiving the axle;
   a wheel retainer to retain the wheel on the axle, the wheel retainer comprising at least one generally semi-circular spring having opposite ends and at least one lug, the or each having a first end attached to the at least one spring and a free end extending radially from the first end, the or each lug is positioned at one of the ends of the at least one generally semi-circular spring and is adapted to abut the hub of the wheel, a keeper extending radially inwardly toward the axis of the axle from the free end of the or each lug and shaped to fit into the circumferential groove in the axle, and the or each semi-circular spring biases the or each keeper radially into the circumferential groove of the axle.

2. A wheel assembly according to claim 1 wherein the at least one semi-circular spring comprises two generally semi-circular springs joined together at the ends opposite thereof to form a generally circular shape, and the at least one lug comprises two lugs positioned at opposite joined ends of the generally semi-circular springs.

3. A wheel assembly according to claim 2 wherein the wheel retainer further comprises a web adjacent each of the lugs to define tool guide apertures for retracting the keepers from the groove and remove the wheel from the axle.

4. A wheel assembly according to claim 3 and further in combination with a U-shaped tool for retracting the keepers from the groove, the tool comprises a pair of spaced shafts connected by a handle, the ends of the spaced shafts have ramped outer surfaces to retract the keepers from the groove upon the insertion of the tool into the tool guide apertures.

5. A wheel assembly according to claim 2 and further comprising a cover mounted to the wheel at a central portion thereof and covering the wheel retainer to retain the wheel retainer in contact with the wheel.

6. A wheel assembly according to claim 5 wherein the lugs further comprise a spacer extending outwardly therefrom in a direction generally parallel to the axle and adapted to contact the cover to maintain the cover in a predetermined spaced relationship to the wheel.

7. A wheel assembly according to claim 1 wherein the wheel retainer is integrally molded from a resilient thermoplastic material.

8. A wheel assembly according to claim 1 and further comprising a cover mounted to the wheel at a central portion thereof and covering the wheel retainer to retain the wheel retainer in contact with the wheel.

9. A wheel assembly according to claim 8 wherein the or each lug further comprises a spacer extending axially away from the wheel and adapted to contact the cover to maintain the cover in a predetermined, spaced relationship to the wheel.

10. A wheel assembly according to claim 1 wherein the wheel retainer further comprises a web adjacent the or each lug to define a tool guide aperture for retracting the keeper from the groove and remove the wheel from the axle.

11. A wheel assembly according to claim 10 and further in combination with a tool for retracting the keeper from the groove, the tool comprises a shaft, an end of the shaft having a ramped outer surface to retract the keeper from the groove upon the insertion of the tool into the tool guide aperture.

12. A wheel assembly according to claim 1 wherein the axle and the wheel central hub each has at least one end, and further comprising an end cap mounted in the opening of the wheel central hub at the one end of the wheel central hub to prevent the end of the axle from passing through the one end of the wheel central hub.

13. A wheel assembly according to claim 12 and further comprising a cover mounted to the wheel at a central portion thereof to cover the end cap and the wheel retainer.

14. A wheel assembly according to claim 1 and further comprising at least one opening extending radially through an end portion of the hub, and wherein the or each keeper extends through the or each opening to retain the wheel retainer on the hub.

15. A wheel assembly according to claim 1 wherein the central hub has at least one notch and the or each keeper is adapted to fit within the or each notch.

16. A wheel assembly comprising:

an axle with an indentation;

a wheel with a central hub having an opening passing therethrough for receiving the axle;

a wheel retainer to retain the wheel on the axle, the wheel retainer comprising a generally circular spring and having at least one lug, the or each lug having a first end attached to the spring and a free end extending radially from the first end, the or each lug being adapted to abut the hub of the wheel, a keeper extending radially inwardly toward the axis of the axle from the free or each lug and shaped to fit into the indentation of the axle, and the generally circular spring biases the or each keeper into the indentation in the axle.

17. A wheel assembly according to claim 16 wherein the wheel retainer is integrally molded from a resilient thermoplastic material.

18. A wheel assembly according to claim 16 wherein the wheel retainer further comprises a web adjacent the or each lug to define a tool guide aperture for retracting the or each keeper from the indentation and remove the wheel from the axle.

19. A wheel assembly according to claim 18 and further in combination with a tool for retracting the or each keeper from the groove, the tool comprises at least one shaft, an end of the or each shaft having a ramped outer surface to retract the or each keeper from the indentation upon the insertion of the tool into the or each tool guide aperture.

20. A wheel assembly according to claim 16 wherein the axle and wheel central hub each have at least one end and further comprising an end cap mounted in the opening of the wheel central hub at the one end of the wheel central hub to prevent the end of the axle from passing through the one end of the wheel central hub.

21. A wheel assembly according to claim 20 and further comprising a cover mounted to the wheel at a central portion thereof to cover the end cap and the wheel retainer.

22. A wheel assembly according to claim 16 wherein the hub has an end portion, and further comprising at least one opening extending radially through the end portion of the hub, and wherein the or each keeper extends radially through the or each opening to retain the wheel retainer on the hub.

23. A wheel assembly according to claim 16 wherein the central hub has at least one notch and the or each keeper is adapted to fit within the or each notch.

24. A wheel assembly comprising:

an axle with an indentation;

a wheel with a central hub having an opening passing therethrough for receiving the axle;

a wheel retainer to retain the wheel on the axle, the wheel retainer comprising at least one semi-circular spring having opposite ends and at least one lug, the or each lug having a first end attached to the or each spring and a free end extending radially from the first end, the or each lug is positioned at one of the ends of the semi-circular spring and is adapted to abut the hub of the wheel, a keeper extending radially inwardly toward the axis of the axle from the free end of the or each lug and shaped to fit into the indentation in the axle, and the semi-circular spring biases the or each keeper into the indentation of the axle; and the wheel retainer further comprises a web adjacent the or each lug to define tool guide apertures for retracting the or each keeper from the indentation to remove the wheel from the axle.

25. A wheel assembly according to claim 24 wherein there are two semi-circular springs joined together to form a circular shape.

26. A wheel assembly according to claim 24 wherein the wheel retainer is integrally molded from a resilient thermoplastic material.

27. A wheel assembly according to claim 24 wherein the hub has an end portion, and further comprising at least one opening extending radially through the end portion of the hub, and wherein the or each keeper extends radially through the or each opening to retain the wheel retainer on the hub.

28. A wheel assembly according to claim 24 wherein the central hub has at least one notch and the or each keeper is adapted to fit within the or each notch.

29. A wheel assembly according to claim 24 wherein the axle and wheel hub each have at least one end, and further comprising an end cap mounted in the opening of the wheel hub at the one end of the wheel hub to prevent the end of the axle from passing through the one end of the wheel hub.

30. A wheel assembly according to claim 29 and further comprising a cover mounted to the wheel at a central portion thereof to cover the end cap and the wheel retainer.

\* \* \* \* \*

UNITED STATES PATENT AND TRADEMARK OFFICE
CERTIFICATE OF CORRECTION

PATENT NO.: 5,716,107

DATED: February 10, 1998

INVENTOR(S): PARKER et al.

It is certified that error appears in the above-identified patent and that said Letters Patent are hereby corrected as shown below:

Col. 6, line 23, "each having" should be "each lug having"
Col. 6, line 34, "ends opposite" should be "opposite ends"
Col. 7, line 38, "the free or" should be "the free end of the or"
Col. 7, line 56, "end and" should be "end, and"

Signed and Sealed this

Nineteenth Day of May, 1998

*Attest:*

BRUCE LEHMAN

*Attesting Officer*        *Commissioner of Patents and Trademarks*